Aug. 9, 1932.     D. E. INMAN     1,870,456
SYNCHRONOUS MOTOR CONTROL
Filed Aug. 26, 1931
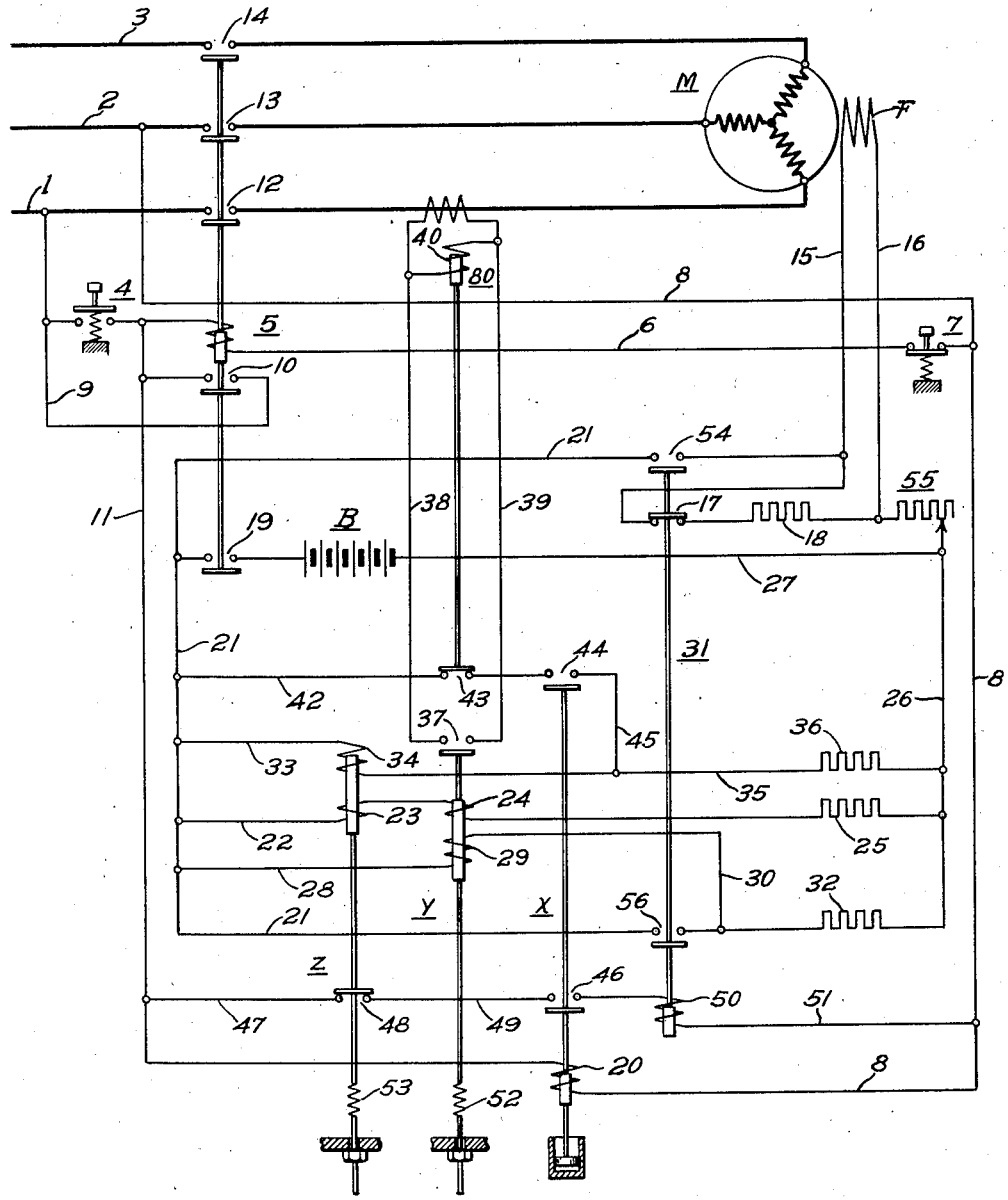
WITNESSES:
INVENTOR
Donovan E. Inman.
BY
ATTORNEY Patented Aug. 9, 1932

1,870,456

UNITED STATES PATENT OFFICE

DONOVAN E. INMAN, OF WILKINSBURG, PENNSYLVANIA, ASSIGNOR TO WESTINGHOUSE ELECTRIC & MANUFACTURING COMPANY, A CORPORATION OF PENNSYLVANIA

SYNCHRONOUS MOTOR CONTROL

Application filed August 26, 1931. Serial No. 559,410.

This invention relates generally to control system for an electric motor, and more particularly relates to a system of control for starting a synchronous motor and for resynchronizing a synchronous motor if pulled out of "step" or synchronism because of a temporary overload.

One of the objects of this invention is to provide for starting a synchronous motor by applying alternating current to the stator windings, applying direct current to the field windings a predetermined interval of time after the application of the alternating current to the stator windings, interrupting the field circuit when a temporary overload occurs on the motor, and for resynchronizing the motor and thereafter applying direct current to the field windings a predetermined interval of time after the occurrence of the temporary overload.

One of the objects of this invention is to effect starting of a synchronous motor during a predetermined interval of time and to effect resynchronizing of the motor when pulled out of synchronism by a temporary overload, during a predetermined interval of time smaller than the time interval required to start the synchronous motor.

Further objects and advantages will become apparent from a study of the following specification when considered in connection with the accompanying drawing, the single figure of which diagrammatically shows one embodiment of my invention.

Referring more particularly to the drawing, the reference character M designates a synchronous motor having a field winding F. A line contactor 5 is disposed to energize the stator windings of the synchronous motor by connecting the stator windings to the supply conductors 1, 2 and 3, leading to a suitable alternating-current generator not shown. The field winding F is provided with the usual discharge resistor 18. To effect the excitation of the field winding, a suitable source of direct current power, such as a battery B, is provided, and the circuit connections for the field winding are controlled by a field contactor 31.

In order that the field contactor may not connect the field winding F in circuit before the motor M has reached substantial synchronism, three time-limit relays X, Y and Z are disposed to control the field contactor 31. The controlling action of these time-limit relays will be more apparent from a study of the sequence of operation during the starting of the synchronous motor as well as from the sequence of operation for resynchronizing the motor.

The time limit relay X, while shown provided with a dashpot, may be of any type of timing device having an adjustable time constant which may be of any value desired. The time limit relays Y and Z are inductive time limit relays provided with adjustable springs 52 and 53 for varying the time constant of these relays over a predetermined range.

A load responsive relay 80 is also shown associated with supply conductor 1 leading to the stator windings, and this load-responsive relay 80 initiates the operation of the necessary timing devices to effect resynchronization of the synchronous motor during operation, if pulled out of synchronism.

A better understanding of the purposes of the various elements may be had from a discussion of the operation of the control system.

Assuming that the supply conductors 1, 2 and 3 are energized by three-phase alternating current and that it is desired to start the synchronous motor M, the starting pushbutton switch 4 is depressed, thereupon establishing a circuit from the energized conductor 1 through push-button switch 4, the actuating coil of line contactor 5, conductor 6, stop push-button switch 7 and conductor 8, to the supply conductor 2. Immediately after the actuating coil of the line contactor 5 is energized, a holding circuit is established for this coil, which circuit may actuating coil of line contactor 5, conductor 9, and contact members 10 on the line contactor 5 to the actuating coil of the line contactor.

With the operation of the line contactor 5, its contact members 12, 13 and 14 are closed and in consequence the stator windings of the motor M are supplied with energy and the motor M starts to accelerate. The line contactor 5 is also provided with contact members 19 for connecting the battery B to the conductors 21 and 26 of the control system, when contactor 5 is closed. It should be noted, however, that the closing of the switch or contact members 19 does not close a circuit for the field winding F, since the contact members 54 of the field contactor 31 are still in open-circuit position.

During the initial stages of operation of the synchronous motor, when the slip is considerable, the respective windings of the synchronous motor act like a transformer, and a current is induced in the field winding F proportional to the slip frequency of the motor. Not to subject the field winding F, and particularly the insulation in this winding, to excessive induced voltages, the field winding F is provided with a discharge resistor 18, and in consequence the current induced in the field winding during starting flows through the resistor 18 by a circuit extending from the conductor 15 through the back contact members 17 of field contactor 31, and discharge resistor 18 to conductor 16.

With the actuation of the starting push-button switch 4, the conductors 11 and 8 were energized and the conductor 11 remains energized even after the starting push button switch is released, the energization being through the conductor 9 and the contact members 10 on the line contactor 5. It is, therefore, obvious that an energizing circuit is established for the actuating coil 20 of the long-time time-limit relay X. This relay, therefore, begins to operate, and after a predetermined comparatively long time interval closes its contact members 44 and 46. However, as line contactor 5 is closed, the time-limit relays Z and Y are energized in part through the energization of their respective magnetizing coils 34 and 29. The circuit for the time-limit relay Z may be traced from the energized conductor 21, which was energized by the closing of the contact members 19 of contactor 5, through conductor 33, magnetizing coil 34 of time-limit relay Z, conductor 35, resistor 36 and conductors 26 and 27 to the battery B. A similar circuit is established for the magnetizing coil 29 of the time-limit relay Y, this circuit extending from the energized conductor 21 through conductor 28, actuating coil 29 of time-limit relay Y, conductor 30, and resistor 32 to the energized conductor 26.

The time-limit relays Z and Y are also provided with neutralizing coils 23 and 24, respectively. These neutralizing coils are energized by a circuit extending from the energized conductor 21 through conductor 22, coil 23 of the time-limit relay Z, coil 24 of the time-limit relay Y and resistor 25 to the energized conductor 26. The neutralizing coils have but few turns, so that their magnetic effect is negligible during the time that the corresponding magnetizing coils 34 and 29, respectively, are energized. However, when the magnetizing coils are deenergized, the neutralizing coils assure that the magnetic circuits of the time-limit relays are neutralized so that the armatures of these relays will under no circumstances "stick". Furthermore, the neutralizing coils, in conjunction with the magnetizing coils and the adjustable spring mechanisms 53 and 52, serve to permit accurate adjustment of the time-constants of the time-limit relays. When the magnetizing coils of the time-limit relays Z and Y are energized, the contact members 37 are immediately moved to circuit-closing position, whereas the contact members 48 are moved to open-circuit position.

During the initial stages of the starting of the synchronus motor M, the load-responsive device 80 will be energized. However, since the time-limit relay Y is immediately caused to operate, the actuating coil 40 of the load-responsive device is shunted, thereby preventing the load-responsive relay from interfering with the sequence of operation of the respective control relays.

After the synchronous motor has accelerated for a predetermined interval of time, the contact members 46 of the time-limit relay X close. However, the closure of these contact members cannot effect the energization of the actuating coil 50 of the field contactor 31 because at this instant the contact members 48 of time limit relay Z are still in open-circuit position. Since contact members 44 are also moved to circuit-closing position by the operation of the time-limit relay X, and since contact members 43 are in circuit-closing position because of the fact that the actuating coil 40 of the load-responsive relay 80 is deenergized by reason of the shunt circuit through conductor 38, contact members 37 and conductor 39, the closure of contact members 44 establishes a shunt circuit for the magnetizing coil 34 of the time-limit relay Z. This shunt circuit may be traced from the energized conductor 21 through conductor 42, closed contact members 43 of the load-responsive relay 80, contact members 44 of the time-limit relay X and conductor 45 to the energized conductor 35.

The magnetizing coil 34 of the time-limit relay Z is thus deenergized and, after a predetermined interval of time, as determined by the characteristics of coils 23 and 34 and the adjustable spring 53, releases its armature, which thereupon descends and closes contact members 48. Since the contact members 46 of relay X are already in closed-circuit position, an energizing circuit is established for the actuating coil of the field contactor 31. This circuit may be traced from the energized conductor 11 through conductor 47, contact members 48 of relay Z, conductor 49, contact members 46 of relay Y, actuating coil 50 of the field contactor 31 and conductor 51 to the energized conductor 8.

From the foregoing discussion, it will be obvious that the actuating coil 50 cannot be energized to connect the field winding F to the source of direct current power B until both of the time-limit relays X and Z have completed their respective operations. The field contactor, during the starting operation, cannot, therefore, be closed prior to the expiration of two predetermined unequal or, when desirable equal intervals of time after the operation of the starting button 4 or the line contactor 5.

When the field contactor 31 has operated, a circuit is established from the battery B through the contact members 19 of the line contactor 5, conductor 21, contact members 54 of contactor 31, conductor 15, the field winding F of the synchronous motors M, conductor 16, field rheostat 55 and conductor 27 to the battery B.

The operation of the field contactor 31 closes contact members 56, thereby establishing a shunt circuit for the magnetizing coil 29 of the time limit relay Y. The magnetizing coil 29 is thereupon deenergized and after a predetermined interval of time, depending upon the inductive time constant of the coil 29, the electrical characteristics of the neutralizing coil 24 and the adjustment of the spring 52, the contact members 37 are moved to open circuit position. The main purpose of the time-limit relay Y is to prevent the opening of the contact members 37 immediately after the operation of the field contactor 31. Obviously, when the field contactor 31 is operated, the synchronous motor is not or may not be completely synchronized. Therefore, the load-responsive relay 80, after contact members 37 open, would operate and effect the opening of the field contactor, through the resultant action of relay Z, and the starting operation of the synchronous motor might thus be impaired. Since the time-limit relay Y prevents the operation of the load-responsive relay 80 for a short interval of time, the motor M is completely synchronized and the load-responsive device will operate only when there is an overload on the motor.

In the usual commercial applications of synchronous motors, it is well known that overloads are of a temporary nature more often than of a long-continued nature. It is, therefore, obvious that if the excitation of the field winding F can be removed during such temporary overload, the speed of the synchronous motor will not drop very much and the motor will be re-synchronized, provided the field is again applied as soon as the overload is removed. By the system of control provided by this invention, such re-synchronization of the synchronous motor may be very readily effected.

During normal operation of the motor, the long-time time-limit relay X is energized, whereas the time limit relays Y and Z are deenergized, that is contact members 44 and 48 are in circuit-closing position, whereas contact members 37 are in open-circuit position.

If a temporary overload occurs, the actuating coil 40 of load-responsive device 80, not being shunted, will be energized by such overload, thereby opening a circuit at the contact members 43. The shunt circuit for the magnetizing coil 34 of the time-limit relay Z is thus removed. The time-limit relay Z will, therefore, be energized, and, since this relay has a very negligible time constant when the magnetizing coil 34 is energized, the contact members 48 are immediately opened. Since the contact members 48 are in series circuit relation with the actuating coil 50 of the field contactor 31, the contactor will be deenergized and, in consequence, the direct-current circuit for the field winding F will be interrupted at contact members 54 and the field winding will be connected by contact members 17 to discharge resistor 18. The excitation of the field is thereby removed and the synchronous motor is not materially retarded during the overload.

With the opening of the field contactor 31, the shunt circuit for the magnetizing coil 29 of the relay Y is interrupted at the contact members 56. The time limit relay Y is thus immediately actuated to close the contact members 37. Since the closing of the contact members 37 reestablishes the shunt circuit for the coil 40, the overload relay 80 will be deenergized and a short interval thereafter the contact members 43 are placed in circuit-closing position. Since the contact members 44 of relay X are already in circuit-closing position, the magnetizing coil 34 of relay Z is deenergized and the time limit relay Z thereupon closes the contact members 48. The contact members 48, however, do not close immediately. The delay is determined by the inductive time constants of the magnetizing coil 34 and of the neutralizing coil 23 and the adjustment of the spring 53. The inductive time limit relay Z is so designed that its time constant, when coil 34 is deenergized, may be as high as 5 to 10 seconds. However, by an appropriate adjustment of the ampere turns of the neutralizing coil 23 and the adjustment of the spring 53, a time interval of any definite period less than 5 to 10 seconds may be selected. It is, of course, obvious for the purposes of this invention that any time-limit relay operable within any desired time may be utilized in lieu of the time-limit relay Z heretofore described, so long as the time constant selected has some reasonable relation to the time of duration of a temporary overload.

After the time-limit relay Z has completed its downward movement, the actuating coil 50 of the field contactor 31 is re-energized and the field winding F is again connected to the source of direct current B. If, during the various operations just discussed, the temporary overload ceases, the motor M will very readily be pulled back into synchronism, and normal operation is resumed. If, during the operation of the various elements just discussed, the overload is maintained, the cycle of operation for the overload relay and the time-limit relays Y and Z is repeated, and the field winding is intermittently connected to the source of direct-current power. Obviously, if the overload continues over an indefinite period, the field windings may be successively excited for a number of times until the conventional protective overload devices usually associated with the motor disconnect the motor from the source of supply.

While I have specifically described one embodiment of my invention, it is apparent that the specific elements disclosed need not be utilized so long as the re-synchronization of the motor is effected by elements which may be interpreted to fall within the broad terms of the appended claims.

I claim as my invention:

1. In a control system, a synchronous motor, a source of alternating current, a line contactor for connecting the motor to the source of alternating current, a field winding, a source of direct-current for the field winding, a field contactor, a long-time time-limit relay started by the operation of the line contactor, a short-time time-limit relay, the operation of which is initiated upon the completion of the operation of the long-time time-limit relay, for effecting the operation of the field contactor, means for deenergizing the field contactor, and means for initiating the operation of the short-time time-limit relay to re-synchronize the motor.

2. In a system for resynchronizing a synchronous motor that has been pulled out of "step" by a temporary overload, a synchronous motor, a field winding for the motor, a source of alternating-current for the motor, a source of direct-current for the field winding, a field contactor, a plurality of time-limit devices operable during starting of the motor for effecting the operation of the field contactor after said time-limit devices have successively operated, and means responsive to an overload on the motor to effect the opening of said field contactor and the reclosing thereof after the successive operation of some of said time-limit devices.

3. In a system for synchronizing and re-synchronizing a synchronous motor, a synchronous motor having stator windings and a field winding, means for energizing the stator windings, a plurality of time-limit devices for effecting the energization of the field winding after the successive operation of the time-limit devices, and means responsive to an overload on the motor for temporarily de-energizing the field winding and for re-energizing the field winding to resynchronize the motor, after the operation of one of said time-limit devices.

4. In a control system for resynchronizing a synchronous motor that has been pulled out of "step" by a temporary overload, a synchronous motor, means for energizing the motor field windings, a source of excitation for the field windings, means operable under certain operating conditions of said motor to connect said field windings to said source a predetermined interval of time after energization of said motor, disconnecting means operable under certain other operating conditions of said motor for disconnecting the windings from said source of excitation, and means responsive to said disconnecting means for reconnecting the field windings to said source within a definite time interval less than the predetermined interval of time.

5. In a system for resynchronizing a synchronous motor that has been pulled out of "step", stator and rotor windings, means for energizing said windings, a pair of time-limit devices having unequal time constants operable successively to effect energization of the rotor winding a definite time interval after energization of the stator windings, said time interval being the sum of two predetermined consecutive intervals, means for deenergizing the rotor windings and means responsive to the smaller of the unequal time intervals for reenergizing said rotor windings.

6. In an electrical control system, a synchronous motor, a source of alternating current for the motor, means for connecting said source to the motor, a field winding for the motor, a discharge resistor disposed to be connected to the field winding, a source of direct current for the field winding, a field contactor for connecting the source of direct-current to, and disconnecting said discharge resistor from, the field winding, a pair of time-limit relays successively operable during starting of the synchronous motor to effect the operation of the field contactor, a relay responsive to a temporary overload on the motor for de-energizing the field contactor, and a time-limit relay for controlling the operation of the field contactor to reconnect the field windings to the source of direct current a predetermined interval of time after the occurrence of the overload.

7. In a system for resynchronizing a synchronous motor that has been pulled out of "step", stator and rotor windings, a pair of contactor means for energizing said windings, three time-limit devices having predetermined time constants two of said devices being sequentially and interdependently operable to effect energization of said rotor winding a definite time interval after energization, said time interval being the sum of two predetermined consecutive intervals, overload responsive means disposed to effect deenergization of the rotor winding by deenergizing said contactor means, means responsive to the deenergization of the one of said contactor means to control the operation of the third time limit device and one of said other time limit devices to effect operation of said contactor means to reenergize the rotor winding.

8. In a control system for a synchronous motor having stator and rotor windings, a source of alternating-current energy, a line contactor for connecting the stator to the source of energy, a source of direct-current energy, a field contactor for connecting the rotor to the source of direct-current, a time-limit device energized by the operation of the line contactor to initiate its timing operation, two other timing devices energized by the operation of the line contactor, said two time-limit devices having a negligible time constant when energized, an overload device, switching means on one of said last named timing devices preventing the operation of said overload device during starting, switching means on the first named timing device for deenergizing one of said last named timing devices, switching means on said last mentioned timing devices to effect the operation of the field contactor a definite time after the operation of the line contactor, said definite time being the sum of the predetermined time intervals of said two timing devices, a switch on the field contactor effecting the deenergization of the last named time-limit device, whereby, the overload device is permitted to operate to effect deenergization of the field contactor, whereupon said field contactor is reenergized after a predetermined time interval as determined by the operation of two of said time-limit devices.

In testimony whereof, I have hereunto subscribed my name this 21st day of August, 1931.

DONOVAN E. INMAN.